3,005,720
BACTERIOSTATIC ARTICLES AND METHOD OF MANUFACTURE

W Kedzie Teller, Kingston, N.J., assignor to Weco Products Company, Chicago, Ill., a corporation of Illinois
No Drawing. Filed Oct. 19, 1959, Ser. No. 847,063
18 Claims. (Cl. 106—15)

The present invention is concerned with improvements in the manufacture of thermoplastic articles having bacteriostatic properties, i.e., the ability to inhibit the growth of bacteria and in many cases to destroy existing bacteria. While the invention has particular applicability to the manufacture of toothbrushes, and will be described as applied to that use, it should be realized that the invention has broader applicability to rendering various types of articles bacteriostatic. Among such articles may be mentioned tableware such as drinking cups, plates, and the like, telephone mouthpieces, spectacle frames, flooring tiles, hair brushes and the like. In each instance, it is desirable to treat the article so that it no longer permits the growth of harmful bacteria, thereby rendering the article substantially antiseptic.

Numerous attempts have been made in the past to provide articles, particularly articles made of thermoplastic resins, reasonably antiseptic. For the most part these attempts involved coating the articles with known antiseptic agents such as mercurial compounds. In many instances, the treatment of the thermoplastic material with the mercurial compound was not entirely satisfactory. In some cases, the mercurial compound was easily washed away after limited use of the article, particularly when the article was a toothbrush. In other cases, the mercurial compound lost its effectiveness upon standing even without contact with water. In some instances, treatment of the thermoplastic article to render it bacteriostatic frequently gave an objectionable color to the article. All in all, the success in rendering thermoplastic articles of this type antiseptic thus far can only be termed partial, and there is still a need for an effective, long lasting method for treating thermoplastic articles to render them bacteriostatic.

Such a method is provided in the process of the present invention. It has now been determined that certain bacteriostatic agents can be included in thermoplastic compositions prior to the formation thereof by molding or extrusion into the desired shapes. Surprisingly, it has been found that with certain bacteriostatic agents, the bacteriostatic effectiveness of the agent is undiminished despite the relatively high temperatures which it undergoes during the formation of the thermoplastic article and in some cases, the effectiveness of the material is actually increased.

The bacteriostatic articles of the present invention consist of a body of a thermoplastic resin having incorporated therein, and uniformly dispersed therethrough, a minor amount of a polychloro salicylanilide. The preferred process of the invention involves providing a particulated mixture of the thermoplastic resin particles and the named bacteriostatic agent, and forming the mixture into a coherent shape at an elevated temperature. The shaping may be done either by molding above the fusion temperature of the mixture or by extrusion of the mixture. When the resulting shaped article solidifies, the bacteriostatic agent is uniformly dispersed throughout the body of the thermoplastic resin and retains its bacteriostatic activity under these conditions.

As examples of products produced according to the invention, I have successfully incorporated the compound known commercially as Anobial having the chemical name 2-hydroxy-5-chlorobenzoic 3',4'-dichloroanilide into thermoplastic materials used for the manufacture of toothbrush handles and have observed excellent bacteriostatic results. Another name for "Anobial" is 5,3',4'-trichlorosalicylanilide.

Another compound falling within the class definition and suitable for the purposes of the invention is known commercially as "Irgasan" having the chemical name 3,5,3',4'-tetrachlorosalicylanilide. This material has a melting point of 161 to 163° C., is tasteless and odorless, and is a free flowing, non-hygroscopic white powder. It is insoluble in water, but is soluble in alkali and in most organic solvents.

An object of the present invention is to provide an improved bacteriostatic article having a body of a thermoplastic material.

Another object of the invention is to provide an improved process for incorporating bacteriostatic agents into thermoplastic resinous articles.

Another object of the invention is to provide an improved method for molding or extruding thermoplastic articles to render the same substantially self-sterilizing.

The present invention is applicable to a wide variety of thermoplastic resinous materials. As examples, there may be mentioned the cellulose derivatives such as cellulose acetate, cellulose acetate butyrate, and the like, and thermoplastic polymers such as polyethylene, vinylidine polymers, copolymers of vinyl acetate, and vinyl chloride, polystyrene, methacrylate polymers, nylon (i.e. polyamide), and the like.

The two materials may be combined simply by mixing the powdered or flaked resin in dry form with particles of the bacteriostatic agent. Generally, the latter will be present in a composition in amounts ranging from about 0.1% to 3% by weight, the remainder being the thermoplastic resin. The powdered mixture may be tumbled to secure more uniform admixture, and molded or extruded under the usual conditions for the particular resin involved. For example, cellulose acetate butyrate is commonly molded at a temperature of about 420° F. to 450° F. while nylon is extruded or molded at temperatures of about 450° F. Molding temperatures for polyethylene are somewhat lower than those mentioned above.

As an alternative, the mixture of particulated resin and particles of the bacteriostatic agent can be mixed and melted, and the melt thus produced can be reground to produce a more uniform particle mixture. Since the bacteriostatic agents are reasonably soluble in a thermoplastic resin, this type of mixing assures a more uniform dispersion of the agent through the resin and provides a molding powder which can be marketed as such.

In the manufacture of toothbrushes, both the handle and the filaments or bristles can be processed in accordance with the present invention. Normally, the handle and bristles are made of different materials, the handle usually being a cellulose derivative, and the bristles being composed of nylon. Alternatively, the handle alone may be composed of the dispersion of bacteriostatic agent in the resin, and the nylon bristles can be treated with mercurial compounds to render them bacteriostatic.

In testing the bacteriostatic properties of the compositions, the method described in FDA circular No. 198 was employed. In this test, a nutrient agar is seeded with *Micrococcus pyogenes* var. *aureus*. The material to be tested is placed within the agar and incubated for a period of about 48 hours. The zone of inhibition in which there is no growth of bacteria is measured with a ruler at various points along the article. Any zone of inhibition whatever is considered satisfactory, and an inhibited zone of two millimeters or more is considered to be excellent.

The following examples illustrate the method of preparing the articles of the present invention, and the results achieved.

Example I

Toothbrush handles were made of cellulose acetate molded at 400° to 420° F. Nylon filaments were employed in the bristles. Both handle and filaments contained 1 by weight of "Anobial" which had been mixed with the resin particles prior to molding of the handle and extrusion of the bristles. Initially, the bristles and the handle both evidenced a zone of bacterial inhibition measuring 1 millimeter. After leaching for 48 hours, the brush still evidenced an inhibited zone of 1 to 2 millimeters and after 72 hours there was no diminution of the zone. After use for ten days, we found that the zone of inhibition about the bristles had decreased somewhat, but that the head and handle still retained their bacteriostatic activity. The zone of inhibition at the head measured 1 millimeter while at the handle the zone of inhibition extended to 6 millimeters.

Example II

Additional tests were made with other thermoplastic resinous materials, each having incorporated therein, 2% by weight of "Irgasan." The following table lists the results obtained from the bacteriostatic test, in the "as is" condition, and after 48 hours of leaching in water:

| Resin | As is, mm. | 48 hours leach, mm. |
|---|---|---|
| Cellulose acetate butyrate | 4 | 1 |
| Polyethylene | 11 | 10 |
| Cellolose acetate propionate | 4 | 3 |
| Methacrylate ("Lucite") | 2-3 | 3-4 |
| Polystyrene | 3 | 3 |

From the foregoing, it will be appreciated that the process and articles of the present invention provide a very effective means for including a bacteriostatic agent with thermoplastic resins. The articles produced retain their bacteriostatic activity for prolonged periods of time and, in fact, may have an increased bacteriostatic activity as the article is subjected to use.

This application is a continuation-in-part of my copending United States application Serial No. 522,158 entitled "Method of Making Bacteriostatic Articles and Articles Made Thereby," filed July 14, 1955, now abandoned.

It will be evident that various modifications can be made to the described embodiments without departing from the scope of the present invention.

I claim as my invention:

1. A molded bacteriostatic plastic material which is compatible in human contact, said material consisting essentially of an organic thermoplastic resin and an organic bacteriostatic agent uniformly distributed through said thermoplastic resin, said bacteriostatic agent having a decomposition temperature above the molding temperature of said organic thermoplastic resin, being characterized by its ability to be safely used in contact with human skin, retaining its bacteriostatic activity after being subjected to the molding temperature of said organic thermoplastic resin, and consisting essentially of a chlorinated salicylanilide selected from the class consisting of 2-hydroxy-5-chlorobenzoic-3',4'-dichloro anilide and 3,5,3', 4'-tetrachlorosalicylanilide.

2. The material of claim 1 in which said bacteriostatic agent is 2-hydroxy-5-chlorobenzoic 3',4'-dichloro anilide.

3. The material of claim 1 in which said bacteriostatic agent is the compound 3,5,3',4'-tetrachlorosalicylanilide.

4. A molded bacteriostatic plastic material which is compatible in human contact, said material consisting essentially of an organic plastic and an organic bacteriostatic agent uniformly distributed through said plastic, said bacteriostatic agent having a decomposition temperature above the molding temperature of said organic plastic, being characterized by its ability to be safely used in contact with human skin, retaining its bacteriostatic activity after being subjected to the molding temperature of said organic plastic, and consisting essentially of a chlorinated salicylanilide selected from the class consisting of 2-hydroxy-5-chlorobenzoic-3',4'-dichloro anilide and 3,5,3',4'-tetrachlorosalicylanilide, said organic plastic being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

5. A molded bacteriostatic plastic material which is compatible in human contact, said material consisting essentially of an organic plastic and an organic bacteriostatic agent uniformly distributed through said plastic, said bacteriostatic agent having a decomposition temperature above the molding temperature of said organic plastic, being characterized by its ability to be safely used in contact with human skin, retaining its bacteriostatic activity after being subjected to the molding temperature of said organic plastic, and consisting essentially of 2-hydroxy-5-chlorobenzoic 3',4'-dichloro anilide, said organic plastic being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

6. A molded bacteriostatic plastic material which is compatible in human contact, said material consisting essentially of an organic plastic and an organic bacteriostatic agent uniformly distributed through said plastic, said bacteriostatic agent having a decomposition temperature above the molding temperature of said organic plastic, being characterized by its ability to be safely used in contact with human skin, retaining its bacteriostatic activity after being subjected to the molding temperature of said organic plastic, and consisting essentially of 3,5,3',4'-tetrachlorosalicylanilide, said organic plastic being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

7. A process for preparing a bacteriostatic plastic which comprises mixing an organic thermoplastic resin with an organic bacteriostatic agent which is solid at ambient atmospheric temperature, heating said mixture to a temperature sufficient to melt the same and below a temperature where said agent decomposes, and molding said thermoplastic resin to obtain the molded plastic composition wherein said bacteriostatic agent exhibits bacteriostatic properties, said bacteriostatic agent consisting essentially of a chlorinated salicylanilide selected from the class consisting of 2-hydroxy-5-chlorobenzoic-3',4'-dichloro anilide and 3,5,3',4'-tetrachlorosalicylanilide.

8. A process for preparing a bacteriostatic plastic which comprises mixing an organic thermoplastic resin with an organic bacteriostatic agent which is solid at ambient atmospheric temperature, heating said mixture to a temperature sufficient to melt the same and below a temperature where said agent decomposes, and molding said thermoplastic resin to obtain the molded plastic composition wherein said bacteriostatic agent exhibits bacteriostatic properties, said bacteriostatic agent consisting essentially of 2-hydroxy-5-chlorobenzoic 3',4'-dichloro anilide.

9. A process for preparing a bacteriostatic plastic which comprises mixing an organic thermoplastic resin with an organic bacteriostatic agent which is solid at ambient atmospheric temperature, heating said mixture to a temperature sufficient to melt the same and below a temperature where said agent decomposes, and molding said thermoplastic resin to obtain the molded plastic composition wherein said bacteriostatic agent exhibits bacteriostatic properties, said bacteriostatic agent consisting essentially of 3,5,3',4'-tetrachlorosalicylanilide.

10. A process for preparing a bacteriostatic plastic which comprises mixing an organic thermoplastic material with an organic bacteriostatic agent which is sold at ambient atmospheric temperature, heating said mixture to a temperature sufficient to melt the same and below a temperature where said agent decomposes, and molding said plastic material to obtain the molded plastic composition wherein said bacteriostatic agent exhibits bacteriostatic properties, said bacteriostatic agent consisting essentially of a chlorinated salicylanilide selected from the class consisting of 2-hydroxy-5-chlorobenzoic-3',4'-dichloro anilide and 3,5,3',4'-tetrachlorosalicylanilide, said thermoplastic resin being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

11. A process for preparing a bacteriostatic plastic which comprises mixing an organic thermoplastic material with an organic bacteriostatic agent which is solid at ambient atmospheric temperature, heating said mixture to a temperature sufficient to melt the same and below a temperature where said agent decomposes, and molding said plastic material to obtain the molded plastic composition wherein said bacteriostatic agent exhibits bacteriostatic properties, said bacteriostatic agent consisting essentially of 2-hydroxy-5-chlorobenzoic 3',4'-dichloro anilide, said organic thermoplastic material being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

12. A process for preparing a bacteriostatic plastic which comprises mixing an organic thermoplastic material with an organic bacteriostatic agent which is solid at ambient atmospheric temperature, heating said mixture to a temperature sufficient to melt the same and below a temperature where said agent decomposes, and molding said plastic material to obtain the molded plastic composition wherein said bacteriostatic agent exhibits bacteriostatic properties, said bacteriostatic agent consisting essentially of 3,5,3',4'-tetrachlorosalicylanilide, said organic thermoplastic material being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

13. A bacteriostatic plastic composition for use in molding a bacteriostatic plastic material which is compatible in human contact, said composition consisting essentially of an organic thermoplastic resin molding composition and an organic bacteriostatic agent uniformly distributed throughout said molding composition, said bacteriostatic agent having a decomposition temperature above the molding temperature of said organic thermoplastic resin molding composition and being characterized by its ability to be safely used in contact with human skin and retain its bacteriostatic properties after being subjected to the molding temperature of said organic thermoplastic resin, said bacteriostatic agent consisting essentially of a chlorinated salicylanilide selected from the class consisting of 2-hydroxy-5-chlorobenzoic-3', 4'-dichloro anilide and 3,5,3',4'-tetrachlorosalicylanilide.

14. A bacteriostatic plastic composition for use in molding a bacteriostatic plastic material which is compatible in human contact, said composition consisting essentially of an organic thermoplastic resin molding composition and an organic bacteriostatic agent uniformly distributed throughout said molding composition, said bacteriostatic agent having a decomposition temperature above the molding temperature of said organic thermoplastic resin molding composition and being characterized by its ability to be safely used in contact with human skin and to retain its bacteriostatic properties after being subjected to the molding temperature of said organic thermoplastic resin, said bacteriostatic agent consisting essentially of 2-hydroxy-5-chlorobenzoic 3',4'-dichloro anilide.

15. A bacteriostatic plastic composition for use in molding a bacteriostatic plastic material which is compatible in human contact, said composition consisting essentially of an organic thermoplastic resin molding composition and an organic bacteriostatic agent uniformly distributed throughout said molding composition, said bacteriostatic agent having a decomposition temperature above the molding temperature of said organic thermoplastic resin molding composition and being characterized by its ability to be safely used in contact with human skin and retain its bacteriostatic properties after being subjected to the molding temperature of said organic thermoplastic resin, said bacteriostatic agent consisting essentially of 3,5,3',4'-tetrachlorosalicylanilide.

16. A bacteriostatic plastic composition for use in molding a bacteriostatic plastic material which is compatible in human contact, said composition consisting essentially of an organic plastic molding composition and an organic bacteriostatic agent uniformly distributed throughout said molding composition, said bacteriostatic agent having a decomposition temperature above the molding temperature of said organic plastic molding composition and being characterized by its ability to be safely used in contact with human skin and retain its bacteriostatic properties after being subjected to the molding temperature of said organic plastic composition, said bacteriostatic agent consisting essentially of a chlorinated salicylanilide selected from the class consisting of 2-hydroxy-5-chlorobenzoic-3',4'-dichloro anilide and 3,5,3',4'-tetrachlorosalicylanilide, said organic plastic being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from 1 to 3% by weight.

17. A bacteriostatic plastic composition for use in molding a bacteriostatic plastic material which is compatible in human contact, said composition consisting essentially of an organic plastic molding composition and an organic bacteriostatic agent uniformly distributed throughout said molding composition, said bacteriostatic agent having a decomposition temperature above the molding temperature of said organic plastic molding composition and being characterized by its ability to be safely used in contact with human skin and retain its bacteriostatic properties after being subjected to the molding temperature of said organic plastic composition, said bacteriostatic agent consisting essentially of 2-hydroxy-5-chlorobenzoic 3',4'-dichloro anilide, said organic plastic being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

18. A bacteriostatic plastic composition for use in molding a bacteriostatic plastic material which is compatible in human contact, said composition consisting essentially of an organic plastic molding composition and an organic bacteriostatic agent uniformly distributed throughout said molding composition, said bacteriostatic agent having a decomposition temperature above the molding temperature of said organic plastic molding composition and being characterized by its ability to be safely used in contact with human skin and retain its bacteriostatic properties after being subjected to the molding temperature of said organic plastic composition, said bacteriostatic agent consisting essentially of 3,5,3',4'-tetrachlorosalicylanilide, said organic plastic being at least one member of the group consisting of cellulose esters, polyethylene, vinylidene polymers, copolymers of vinyl acetate and vinyl chloride, styrene polymers, methacrylate polymers and polyamides, and the content of said bacteriostatic agent in said plastic material being from about 1 to 3% by weight.

References Cited in the file of this patent

UNITED STATES PATENTS

| | | |
|---|---|---|
| 2,865,861 | Stephens | Dec. 23, 1958 |
| 2,919,200 | Dubin et al. | Dec. 29, 1959 |

FOREIGN PATENTS

| | | |
|---|---|---|
| 727,343 | Great Britain | Mar. 30, 1955 |